United States Patent
Badura et al.

(10) Patent No.: US 9,290,214 B2
(45) Date of Patent: Mar. 22, 2016

(54) PORTAL TRAILER FOR A TUGGER TRAIN

(71) Applicant: Jungheinrich Aktiengesellschaft, Hamburg (DE)

(72) Inventors: Klaus-Peter Badura, Barum (DE); Arne Krasse, Lüneburg (DE); Jörg Ziemann, Hamburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 14/317,653

(22) Filed: Jun. 27, 2014

(65) Prior Publication Data

US 2015/0001830 A1    Jan. 1, 2015

(30) Foreign Application Priority Data

Jun. 28, 2013  (DE) .................. 10 2013 010 830

(51) Int. Cl.
  *B62D 53/00*  (2006.01)
  *B62B 5/00*  (2006.01)
(52) U.S. Cl.
  CPC .............. *B62D 53/00* (2013.01); *B62B 5/0079* (2013.01); *B62D 53/005* (2013.01)
(58) Field of Classification Search
  CPC .... B62D 53/00; B62D 53/005; B62B 5/0079; B60P 3/40
  See application file for complete search history.

(56) References Cited

U.S. PATENT DOCUMENTS

| | | | | |
|---|---|---|---|---|
| 3,631,999 | A * | 1/1972 | Walerowski | 414/458 |
| 4,076,137 | A * | 2/1978 | Kucera | 414/460 |
| 4,415,518 | A | 11/1983 | Pochurek et al. | |
| 4,515,518 | A * | 5/1985 | Gilbert et al. | 414/459 |
| 5,572,005 | A * | 11/1996 | Hamilton et al. | 235/381 |
| 5,607,129 | A * | 3/1997 | Kim | 248/98 |
| 6,866,463 | B2 * | 3/2005 | Riordan et al. | 414/498 |
| 8,302,975 | B2 * | 11/2012 | Hergeth | 280/47.19 |
| 8,490,993 | B2 * | 7/2013 | Benoit | 280/204 |
| 2002/0105169 | A1 * | 8/2002 | Dahl | 280/651 |
| 2005/0006861 | A1 * | 1/2005 | Dubois et al. | 280/33.998 |
| 2008/0084039 | A1 * | 4/2008 | Moulton | 280/47.35 |

FOREIGN PATENT DOCUMENTS

| | | |
|---|---|---|
| DE | 199 58 086 A1 | 6/2001 |
| DE | 10 2004 059 245 B3 | 2/2006 |
| DE | 603 00 189 T2 | 4/2006 |
| DE | 1 2007 022 525 | 11/2008 |
| DE | 20 2009 002 478 U1 | 7/2009 |
| DE | 10 2008 062 727 A1 | 7/2010 |
| DE | 20 2012 002 489 | 7/2012 |
| DE | 10 2011 017 346 | 10/2012 |
| EP | 2 161 182 B1 | 6/2011 |
| JP | 10291473 A | 11/1998 |

* cited by examiner

*Primary Examiner* — Joseph Rocca
*Assistant Examiner* — Gabriela C Craciun
(74) *Attorney, Agent, or Firm* — Vidas, Arrett & Steinkraus, P.A.

(57) ABSTRACT

A portal trailer for a tugger train, consisting of a front, rear and middle trailer section, between which respectively a receiving area for a dolly to be carried along is provided, wherein the front is connected with the middle and the middle with the rear trailer section each via a portal-shaped arch and the middle trailer section has a pair of rollers or wheels.

10 Claims, 3 Drawing Sheets

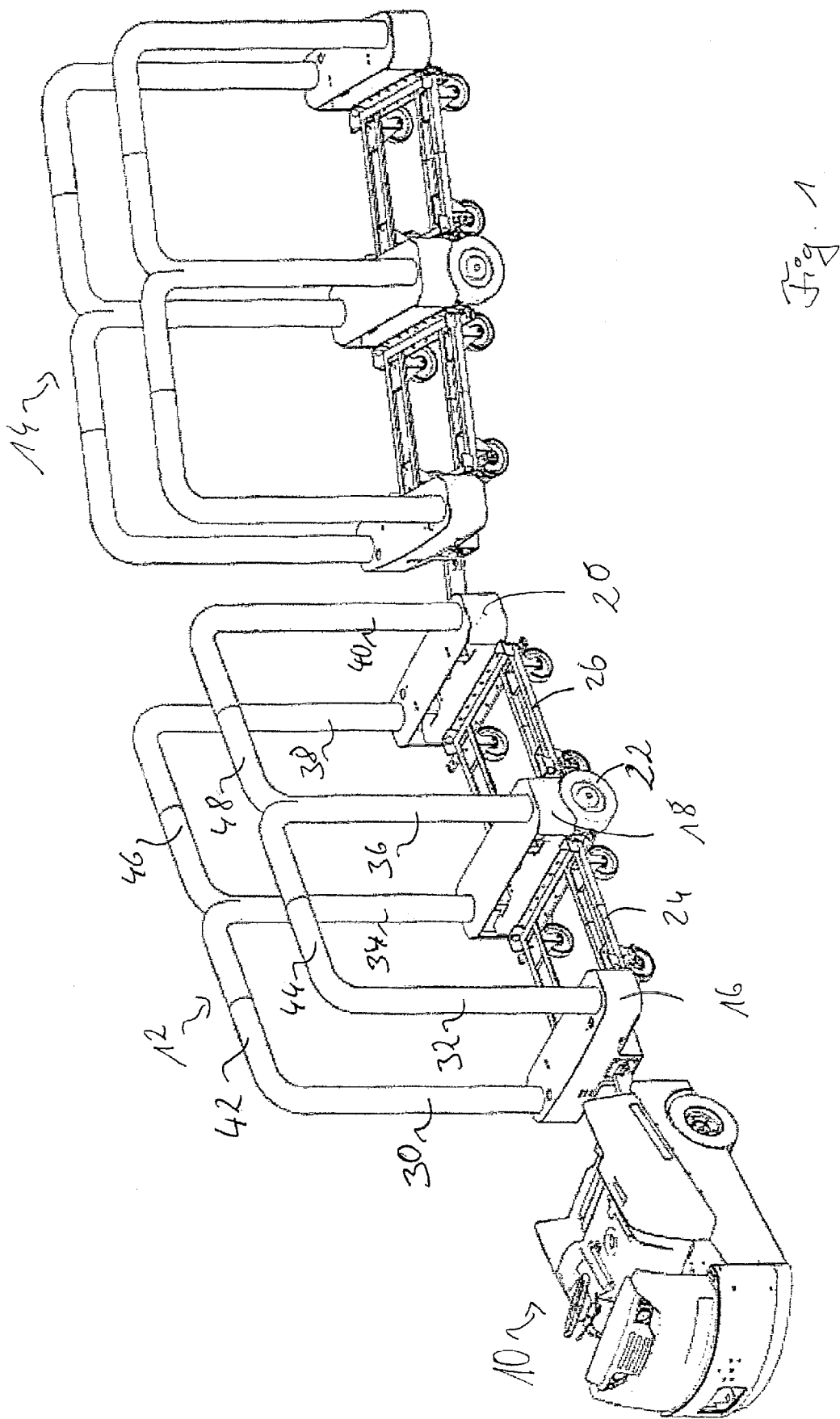

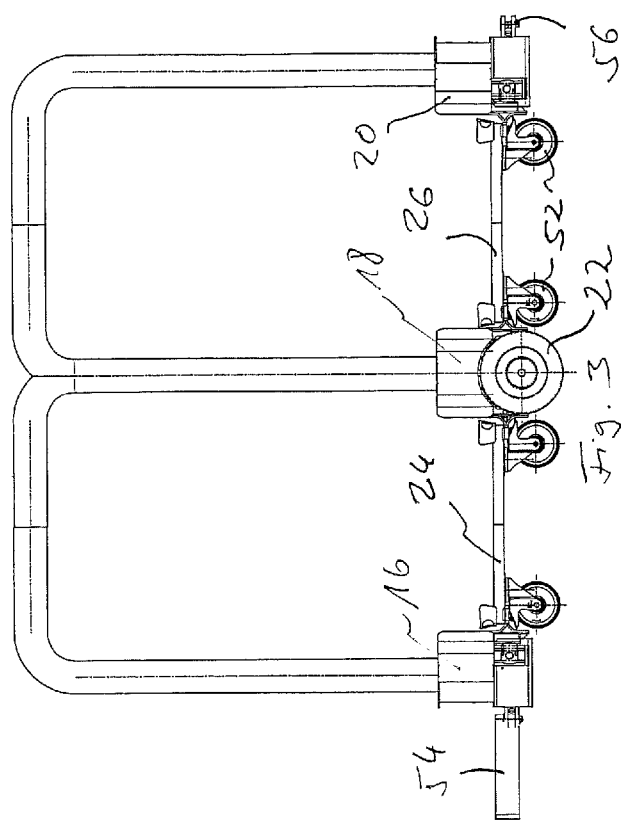
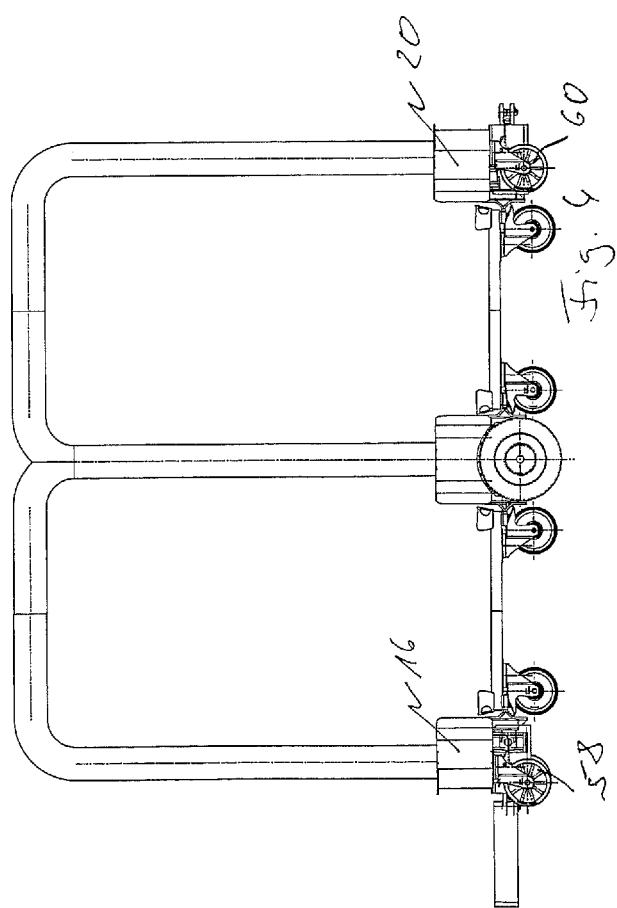

PORTAL TRAILER FOR A TUGGER TRAIN

CROSS-REFERENCE TO RELATED APPLICATIONS

This Utility Patent Application claims priority to DE 10 2013 010 830.6, filed on Jun. 28, 2013.

STATEMENT REGARDING FEDERALLY SPONSORED RESEARCH

Not applicable.

BACKGROUND OF THE INVENTION

The present invention relates to a portal trailer for a tugger train.

Tugger trains, sometimes also referred to as transport trains, are used in internal logistics to transport material on specified routes. Tugger trains thereby consist of a non-rail-guided towing vehicle and one or several trailers.

A trailer for a transport trolley, which has an E-shaped frame for receiving a dolly, became known from DE 603 00 189 T2, the entire contents of which is incorporated herein by reference. The trailer has two fixed wheels, the rotational axes of which overlap.

A transport system for a forklift-free supply is known from DE 199 58 086 A1, the entire contents of which is incorporated herein by reference. A C-shaped trailer frame with four wheels is hereby used, which has height-adjustable load-lifting apparatuses on its inside.

A trailer train trailer, which has a roller-guided frame and an inner trolley guided along in the trailer train, provided with steering rollers and pushable into and out of the trailer on them at the same level as the frame-side guide rollers, is known from EP 2 161 182 B1, the entire contents of which is incorporated herein by reference. The inner trolley is supported in the transport state of the trailer train under load removal from the inner-trolley-side steering rollers in a weight-transferring manner on the trailer frame and via this on the trailer-side guide rollers.

A portal trailer, in which a front and a rear trailer section are interconnected via a portal-shaped arch construction, is known for example from FIG. 10 in JP 10-291473, the entire contents of which is incorporated herein by reference. The advantage of a portal trailer is that the dolly to be received can be pushed into the portal trailer from both sides and thus can be used more flexibly in internal logistics.

BRIEF SUMMARY OF THE INVENTION

An object of the invention is to provide a portal trailer, which has the highest precisely tracking steering with the simplest structure and also offers the possibility of transporting a dolly in the raised state.

The portal trailer according to the invention is provided and determined for a tugger train. The portal trailer consists of a front, rear and a middle trailer section, which are arranged behind each other along the longitudinal direction of the portal trailer. A receiving area for a dolly to be carried along in the portal trailer is located respectively between two neighboring trailer sections. In the case of the portal trailer according to the invention, the front and the middle trailer section are interconnected via a portal-shaped arch. The middle and the rear trailer section are also interconnected via a portal-shaped arch. The middle trailer section has a pair of rollers. The rollers, sometimes also called center axle steering, make it possible for the portal trailer to follow the curve in a precisely tracking manner. The structure with three trailer sections and two portal arches, which result overall in an M-shaped portal trailer, is particularly simple and without any active steering due to the rollers mounted on the middle trailer section.

In a preferred further development of the portal trailer according to the invention, the rollers on the middle trailer section are each provided with a rotational axis perpendicular to the trailer longitudinal direction. The rollers are preferably arranged rigidly on the middle trailer section and have rotational axes that are flush with each other.

In a preferred further development, the middle trailer section is equipped with a lifting apparatus, which permits the raising of the middle trailer section as well as the front and the rear trailer section via the portal-shaped arches.

Through the raising of the middle trailer section, a dolly received between two adjacent trailer sections is also raised so that its wheels are free during transport in the portal trailer and do not touch the ground.

In an advantageous further development, the portal trailer according to the invention has a holding apparatus for a dolly in the receiving area. The holding apparatus has a profile rail, on which the dolly to be transported rests during transport. The use of a profile rail in the receiving area permits the pushing of the dolly to be transported into the holding apparatus from both sides. Through the raising of the portal trailer, the dolly then rests on the profile rail and is also raised.

In a preferred embodiment, each trailer section has a portal brace laterally on opposite-lying sides, which is connected with a portal brace of a neighboring trailer section via a portal arch. The trailer sections of the portal trailer are interconnected on their outer-lying ends through portal-shaped arches, consisting of a portal brace and a portal arch.

In a preferred embodiment, a towing drawbar is provided on the front and/or rear trailer section. A trailer coupling can also be provided on the rear and/or front trailer section.

In a preferred further development, additional rollers are provided on the front and/or rear trailer section. During a raising of the middle trailer section, the additional rollers also lose contact with the ground. The additional rollers serve to be able to better move and drive the portal trailer in the non-raised state. For this, the additional rollers are designed as steering rollers.

BRIEF DESCRIPTION OF THE SEVERAL VIEWS OF THE DRAWINGS

The invention will be further explained below with reference to the accompanying drawings of exemplary embodiments. The drawings show:

Preferred exemplary embodiments are described in greater detail below. The figures show:

FIG. 1 a tugger train with two portal trailers according to the invention, each of which carries along two dollies.

DETAILED DESCRIPTION OF THE INVENTION

Figure 2A:
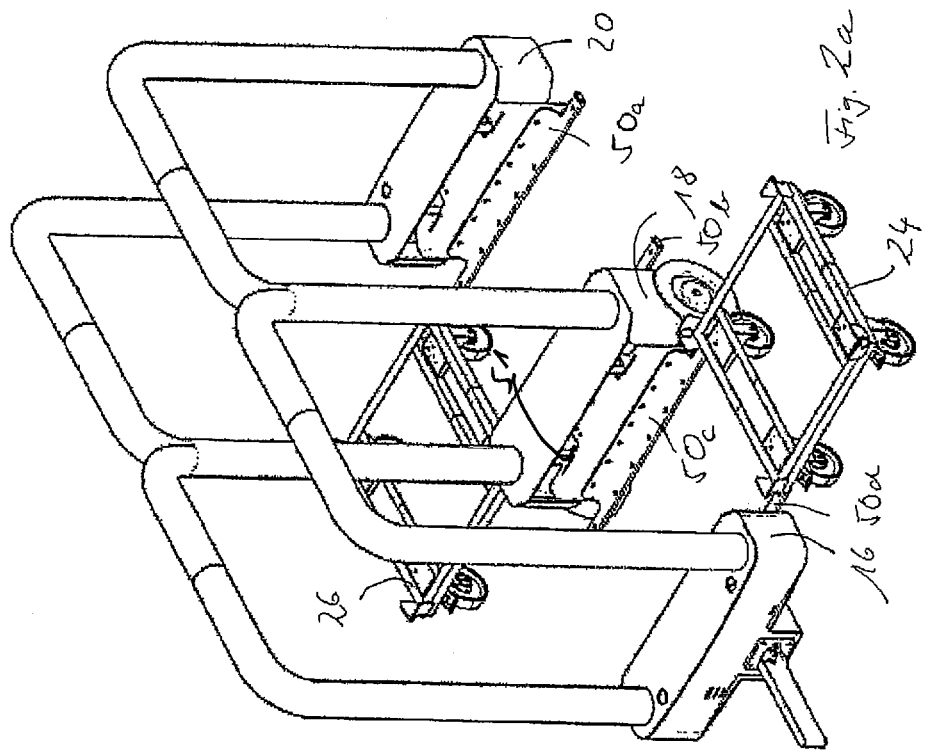
FIG. 2*a-b* the loading and unloading of the portal trailer with two transport trolleys, FIG. 3 a view of a first embodiment of the portal trailer from the side and FIG. 4 a second embodiment of the portal trailer in a view from the side.

While this invention may be embodied in many different forms, there are described in detail herein a specific preferred embodiment of the invention. This description is an exemplification of the principles of the invention and is not intended to limit the invention to the particular embodiment illustrated.

FIG. 1 shows a transport or tugger train with a towing vehicle 10 and two towed trailers 12, 14. The shown trailers 12 and 14 are mainly built the same. The portal trailer 12 has a front trailer section 16, a central or middle trailer section 18 and a rear trailer section 20. The middle trailer section 18 is provided with rollers 22 on its outer-lying sides. As can be seen in the exemplary embodiment, the rollers 22 of the middle trailer section are equipped with a comparatively large diameter, comparable to the wheels of the towing vehicle 10, so that the terms "rollers" in the middle section also includes wheels.

A dolly 24 is received between the trailer sections 16 and 18. A second dolly 26 is provided between the middle trailer section 18 and the rear trailer section 20. The portal trailers can generally be used in both directions so that front and rear trailer sections only serve for better orientation and do not determine the driving direction of the trailer. On the front trailer section 16, a portal brace 30, 32 is provided respectively on the outer-lying sides. The middle trailer section 18 has the portal braces 34, 36, while on the rear trailer section 20 the portal braces 38 and 40 are provided. The portal braces 30 and 34 as well as the braces 32 and 36 are interconnected via respectively one portal arch 42, 44. The portal braces 34 and 38 as well as 36 and 40 are also interconnected via the arches 46 and 48.

As can be seen in the figures, the portal brace 30 can for example be designed as one piece with a first half of the portal arch 40 and the portal brace 34 can be connected in the center with a second part of the portal arch extending in the direction of the front trailer section. The difference between the portal brace and the portal arch only relates to the geometry and the spatial position and not to the components forming the portal-shaped arch. Overall, the portal-shaped arches form an M-shaped structure for the portal trailer.

The dollies 24 and 26 received between the trailer sections are only shown schematically as rolling platform in the illustration shown. Of course, higher and closed dollies can also be transported with the portal trailer. When the dolly is closed, however, its height is restricted by the height of the portal arches 42, 44, 46, 48.

FIG. 2a shows a portal trailer according to the invention, in which the dollies 24 and 26 were pushed laterally out of the portal trailer in different directions.

As can be seen in FIG. 2a, one profile bar 50a to d each is provided between the trailer sections sides facing each other. The profile bars have an L-shaped profile, onto which the dollies 24, 26 are pushed. The middle trailer section 18 can be raised by a lifting apparatus 51. The distance of the profile bars 50b, 50c with respect to ground increases due to the raising so that a pushed-in dolly 24, 26 is also raised. The portal-shaped arches and the rear and the front trailer section are also raised simultaneously so that the profile bars 50a and 50d are also raised as holding apparatuses for the dollies.

Figure 2B:
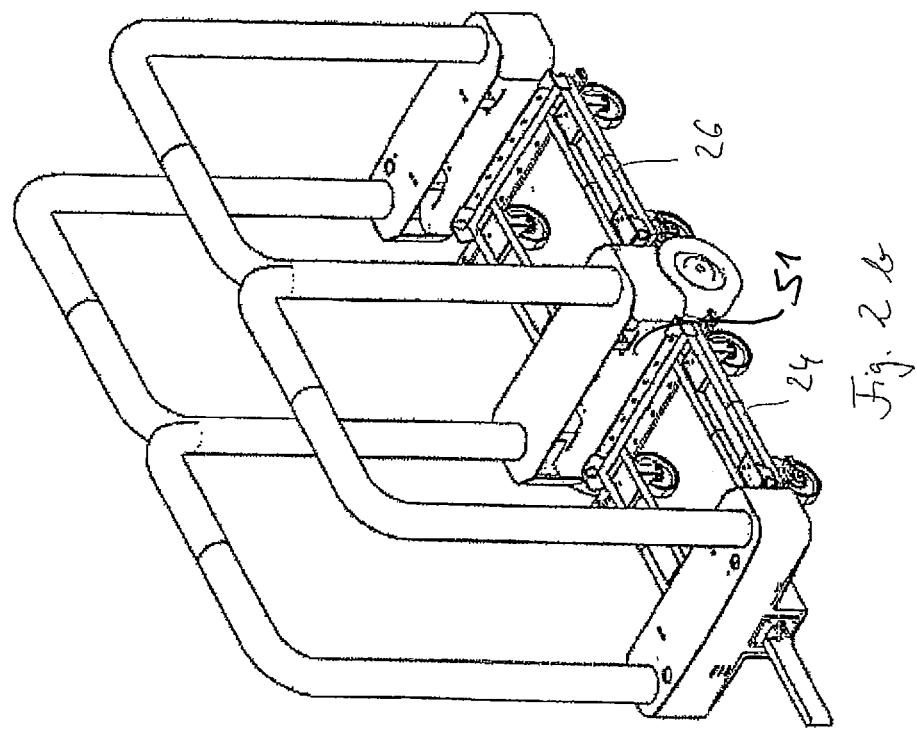

FIG. 2b shows the dolly pushed in between the trailer sections, which rest on the profile rails as lifting apparatuses.

FIG. 3 shows the portal trailer according to the invention in its raised position, wherein the wheels 22 of the portal trailer stand on the ground and the dollies 24, 26 and their wheels 52 have come clear of the ground. The two wheels 22 in the middle trailer section 18 have rotational axes that are flush with each other. A rigid axle can also be provided between the wheels 22. For steering, the wheels 22 must be able to turn independently on this rigid axle so that there is no transverse movement during cornering.

FIG. 3 also shows a pivoting drawbar 54, which is mounted in a pivotable manner on the front trailer section 16. This includes a trailer coupling 56, which can receive a correspondingly designed drawbar.

FIG. 4 shows an alternative embodiment of the portal trailer according to the invention, in which the front and rear section 16', 20' are additionally provided with steering rollers 58, 60. The steering rollers 58, 60 make it possible to prevent placement of the rear or respectively front trailer section on the floor when the portal trailer is lowered. Thus, the unloaded portal trailer can also be moved and positioned well for further work.

LIST OF REFERENCES

10 Towing vehicle
12 Trailer
14 Trailer
16 Front trailer section
16' Front trailer section
18 Middle trailer section
20 Rear trailer section
20' Rear trailer section
22 Rollers
24 Dolly
26 Dolly
30 Portal brace
32 Portal brace
34 Portal brace
36 Portal brace
38 Portal brace
40 Portal brace
42 Portal arch
44 Portal arch
46 Portal arch
48 Portal arch
50a Profile bar
50b Profile bar
50c Profile bar
50c Profile bar
50d Profile bar
52 Wheel on dolly
54 Pivoting drawbar
56 Trailer coupling
58 Steering rollers
60 Steering rollers

What is claimed is:

1. A portal trailer for a tugger train, consisting of a front, rear and middle trailer section, between which respectively a receiving area for a dolly to be carried along is provided, wherein the front is connected with the middle and the middle with the rear trailer section each via a portal-shaped arch and the middle trailer section has a pair of rollers or wheels; wherein the front, rear, and middle trailer sections are fixedly arranged along a trailer longitudinal direction, and wherein the middle trailer section has a lifting apparatus, with which the middle trailer section and also the front and rear trailer section via the arches are raised.

2. The portal trailer according to claim 1, wherein the rollers or wheels are rigidly arranged on the middle trailer section with their rotational axis perpendicular to the trailer longitudinal direction.

3. The portal trailer according to claim 1, wherein in the raised state the front and the rear trailer sections have no ground contact.

4. The portal trailer according to claim 3, wherein a holding apparatus for the dolly is provided in the receiving area, which has a profile rail, on which the dolly to be transported rests during transport.

5. The portal trailer according to claim 1, wherein each trailer section has one portal brace each on opposite-lying sides with respect to the vehicle longitudinal direction, which is connected with a portal brace of a neighboring trailer section via the portal arch.

6. The portal trailer according to claim 1, wherein at least the front or rear trailer section has a towing drawbar.

7. The portal trailer according to claim 1, wherein at least the front or rear trailer section has a trailer coupling.

8. The portal trailer according to claim 1, wherein at least the front or rear trailer section has additional rollers.

9. The portal trailer according to claim 8, wherein the additional rollers are steering rollers.

10. The portal trailer according to claim 1, wherein the distance from the rear trailer section to the front trailer section is fixed.

* * * * *